(12) United States Patent
Gaebel et al.

(10) Patent No.: US 7,250,621 B2
(45) Date of Patent: Jul. 31, 2007

(54) METHOD AND ARRANGEMENT FOR THE PLASMA-BASED GENERATION OF INTENSIVE SHORT-WAVELENGTH RADIATION

(75) Inventors: Kai Gaebel, Jena (DE); Christian Ziener, Jena (DE); Guido Hergenhan, Jena (DE)

(73) Assignee: Xtreme technologies GmbH, Jena (DE)

( * ) Notice: Subject to any disclaimer, the term of this patent is extended or adjusted under 35 U.S.C. 154(b) by 371 days.

(21) Appl. No.: 11/045,779

(22) Filed: Jan. 27, 2005

(65) Prior Publication Data
US 2005/0258768 A1 Nov. 24, 2005

(30) Foreign Application Priority Data
Jan. 30, 2004 (DE) .................. 10 2004 005 242

(51) Int. Cl.
*H01J 49/00* (2006.01)
(52) U.S. Cl. .................. 250/504 R; 378/119
(58) Field of Classification Search .............. None
See application file for complete search history.

(56) References Cited
U.S. PATENT DOCUMENTS

| 4,058,486 A | 11/1977 | Mallozzi et al. |
| 5,577,092 A | 11/1996 | Kublak et al. |
| 6,728,337 B2 * | 4/2004 | McGeoch .................. 378/119 |

(Continued)

FOREIGN PATENT DOCUMENTS

| EP | 0 186 491 | 6/1992 |
| EP | 1 365 635 | 11/2003 |
| WO | WO 97/40650 | 10/1997 |
| WO | WO 01/30122 | 4/2001 |

OTHER PUBLICATIONS

SPIE Proceedings, vol. 4688, pp. 619-625, "Laser plasma radiation sources based on a laser-irradiated gas puff target for x-ray and EUV lithography technologies" H. Fiedorowicz, et al.

(Continued)

*Primary Examiner*—David A. Vanore
(74) *Attorney, Agent, or Firm*—Reed Smith LLP

(57) ABSTRACT

The invention is directed to a method and an arrangement for the plasma-based generation of intensive short-wavelength radiation, particularly EUV radiation. The object of the invention, to find a novel possibility for plasma-based generation of intensive soft x-radiation, particularly EUV radiation, which permits efficient energy conversion in the desired spectral band with high repetition frequency (several kHz) of the plasma excitation, minimized emission of debris and low erosion of the nozzle of the target generator, is met according to the invention in that an additional energy beam is directed on the target flow spatially in advance of its interaction with the high-energy beam, the target flow being acted upon by this additional energy beam with substantially weaker energy pulses compared to the high-energy beam in order to divide the target flow into a first portion and at least one second portion, wherein the target flow is excited at an interaction point within the second portion by the high-energy beam for generating a hot, radiating plasma, and the second portion is decoupled from the first portion and therefore from the target generator in such a way that a hydrodynamic disturbance generated in the second portion by the pulse of the high-energy beam is transmitted into the first portion only negligibly.

34 Claims, 7 Drawing Sheets

U.S. PATENT DOCUMENTS

| | | | | |
|---|---|---|---|---|
| 6,831,963 B2 * | 12/2004 | Richardson | ................. | 378/119 |
| 6,865,255 B2 * | 3/2005 | Richardson | ................. | 378/119 |
| 6,924,600 B2 * | 8/2005 | Mochizuki | ............. | 315/111.21 |
| 7,092,488 B2 * | 8/2006 | Richardson | ................. | 378/119 |
| 7,122,814 B2 * | 10/2006 | Hergenhan et al. | ..... | 250/504 R |
| 7,161,163 B2 * | 1/2007 | Gaebel et al. | .......... | 250/504 R |
| 7,193,229 B2 * | 3/2007 | Banine et al. | .......... | 250/504 R |

OTHER PUBLICATIONS

Journal of Physics E: Scientific Instruments 1974, vol. 7, No. 9, pp. 715-718 "A continuous droplet source for plasma production with pulse lasers" U, Schwenn, et al.

* cited by examiner

METHOD AND ARRANGEMENT FOR THE PLASMA-BASED GENERATION OF INTENSIVE SHORT-WAVELENGTH RADIATION

CROSS-REFERENCE TO RELATED APPLICATIONS

This application claims priority of German Application No. 10 2004 005 242.5, filed Jan. 30, 2004, the complete disclosure of which is hereby incorporated by reference.

BACKGROUND OF THE INVENTION a) Field of the Invention

The invention is directed to a method and an arrangement for plasma-based generation of intensive short-wavelength radiation in which a target flow comprising defined portions which is made available in a reproducible manner interacts with a pulsed energy beam for exciting radiation-emitting plasma. The invention is particularly suitable for the generation of soft x-radiation, preferably EUV radiation, for the exposure of very small structures in semiconductor lithography.

b) Description of the Related Art

In the prior art relating to energy beam pumped plasma-based radiation sources, mass-limited targets for plasma generation have become increasingly accepted because they minimize unwanted particle emission (debris) compared to other types of targets. A mass-limited target is wherein the particle number in the focus of an energy beam is limited to the order of magnitude of the ions used for generating radiation. In this connection, EP 0 186 491 B1 describes the excitation of individual droplets, i.e., exactly one droplet is impinged upon per energy pulse. The droplet size is of the same order of magnitude as the laser focus. When a pulsed energy beam is directed on a series of individual droplets, it is necessary to synchronize both events with one another with respect to space and time. However, the generation of droplets in a vacuum chamber depends upon the characteristics of the target material and is not possible for every target material. For example, xenon cannot be used to generate individual droplets under the process conditions of EUV lithography.

Further, targets in the form of clusters (U.S. Pat. No. 5,577,092), gas puffs (H. Fiedorowicz, SPIE Proceedings, Vol. 4688, 619) or aerosols (WO 01/30122) have been described for plasma generation. However, the average density of such targets in the focus volume is substantially less than in liquid targets or solid targets because the target comprises microscopic particles or is in gaseous form. Further, the target divergence is generally so great (opening angle of several degrees) that the average target density decreases rapidly with increasing distance from the nozzle. Therefore, the energy beam can be coupled in efficiently only in the immediate vicinity of the nozzle, which leads to a high thermal loading of the nozzle and inevitably results in nozzle erosion.

While arrangements with a continuous target jet (liquid or frozen jet) such as is described in WO97/40650, for example, allow a relatively large working distance from the nozzle, they are susceptible to shock waves. This means that the radiation-generating energy pulse that is coupled in causes hydrodynamic disturbances extending relatively far along the jet axis and the characteristics of the continuing jet for optimal plasma generation and radiation generation are impaired. These disturbances prevent a high pulse repetition frequency because it is necessary to wait for the disturbances to die down before the next pulse.

Further, the prior art includes plasma-based radiation sources with optimized energy conversion in a determined spectral range. For example, it is known from U.S. Pat. No. 4,058,486 to use a defined pre-pulse prior in time to a main excitation pulse generating the radiating plasma in order to increase the efficiency of the energy conversion of the excitation radiation into emitted radiation of the plasma in the EUV range.

OBJECT AND SUMMARY OF THE INVENTION

It is the primary object of the invention to find a novel possibility for plasma-based generation of intensive short-wavelength radiation, particularly soft x-radiation, which permits efficient energy conversion in a desired spectral band with high repetition frequency (several kHz) of the plasma excitation, minimized emission of debris and low erosion of the nozzle of the target generator.

In a method for the plasma-based generation of soft x-radiation, particularly for the generation of extreme ultraviolet (EUV) radiation, in which defined portions of a target flow that is provided in a reproducible manner are made to interact with a pulsed high-energy beam for exciting a radiation-emitting plasma, wherein the interaction results in the generation of a radiation-emitting plasma, the above-stated object is met, according to the invention, in that an additional energy beam is directed on the target flow spatially in advance of its interaction with the high-energy beam, the target flow being acted upon by this additional energy beam with substantially weaker energy pulses compared to the high-energy beam in order to divide the target flow into a first portion and at least one second portion, wherein the target flow is excited at an interaction point within the second portion by the high-energy beam for generating a hot, radiating plasma, and in that the first portion is generated by the target generator as a continuous target jet with a low divergence and the second portion is decoupled from the first portion and therefore from the target generator at least in such a way that a hydrodynamic disturbance generated in the second portion by a pulse of the high-energy beam at the interaction point is transmitted into the first portion as a negligible disturbance compared to the disturbance of the additional energy beam.

Depending on whether the division of the target flow into two portions is carried out partially or completely, the energy pulse of the additional energy beam can advantageously impinge on the target flow before, simultaneously with, or after the pulse of the high energy beam. When the target flow is repeatedly acted upon by the additional energy pulse in a regular sequence in order to generate a series of defined second portions, each of these portions is a mass-limited individual target. In semiconductor lithography, the pulses of the additional energy beam and of the high-energy beam are directed—so as to be synchronized with one another—on the target flow preferably with repetition frequencies of several kilohertz. The target flow is advantageously provided as a continuous target flow in liquid or solid aggregate state at least at the location of the impinging additional energy beam. A liquefied or frozen gas, preferably an inert gas, e.g., xenon, is preferably used as target flow.

The additional energy beam is advantageously split off from the high-energy beam, and the pulses of the high-energy beam and additional energy beam are electrically and/or optically synchronized by means of at least one synchronizing unit.

However, the additional energy beam can also advisably be prepared from a separate radiation source and its pulses can be synchronized with those of the high-energy beam by suitable triggering.

Further, in an arrangement for the plasma-based generation of soft x-radiation, particularly for the generation of extreme ultraviolet (EUV) radiation, with a target generator for providing a low-divergence target flow which is provided in a reproducible manner in a vacuum chamber and with a pulsed high-energy beam that is focused on defined portions of the target flow at an interaction point for generating a radiation-emitting plasma, the above-stated object is met, according to the invention, in that an additional pulsed energy beam is directed on the target flow spatially in front of the interaction point for dividing the target flow into a first portion and at least one second portion, the additional energy beam has a substantially lower pulse energy compared to the high-energy beam, the first portion has a connection to the target generator that is characterized by a continuous, low-divergence target flow and the second portion is decoupled from the continuous target flow and, therefore, from the target generator at least in such a way that a hydrodynamic disturbance generated in the second portion by a pulse of the high-energy beam at the interaction point is transferred into the first portion at most as a disturbance that is negligible compared to the disturbance of the additional energy beam, and in that means are provided for synchronizing the pulses of the high-energy beam and additional energy beam.

The target flow from the target generator to a dividing point defined by the impingement of the additional energy beam is advantageously a continuous target flow of liquefied or frozen gas, preferably an inert gas, particularly xenon.

In order to generate the additional dividing energy beam, a separate beam source is advisably provided. However, the additional energy beam can also be diverted from (coupled out of) the high-energy beam.

An electron beam, an ion beam or a laser beam is preferably applied as an additional energy beam. In the latter case, the high-energy beam is likewise advantageously a laser beam for exciting the radiating plasma. However, it can also be a particle beam, e.g., an electron beam or an ion beam.

As an alternative to the possibility of providing the dividing laser beam from a separate laser source, preferably optical means in the form of a beam guiding device are provided for coupling out a portion from the excitation laser beam.

In order to couple in the excitation laser beam and dividing laser beam at different locations of the target flow, a focusing device is advisably provided which has either separate focusing lenses or a common focusing lens for the excitation laser beam and dividing laser beam; in the latter case, the excitation laser beam and dividing laser beam are coupled in and focused at different angles as beam bundles for economizing on space.

A beam guiding device containing at least one beam-deflecting element is advantageously provided for directing the beam bundles at defined different angles relative to one another. Further, a polarization-selective or wavelength-selective element or a tilting mirror can advisably be provided for adjusting the angle of incidence of at least one of the beam bundles on the focusing lens in the beam guiding device.

In order to minimize the return of hydrodynamic disturbance (shock waves due to the generation of the hot plasma at the interaction point) into the continuous target flow and/or to improve the conversion efficiency of desired emitted radiation in the hot plasma, a synchronizing device is provided for adjusting the time position of the pulses of the high-energy beam and dividing beam (additional energy beam). The synchronizing device has a trigger unit and/or a delay element for synchronizing two separate energy beam sources for the high-energy beam and the additional energy beam. The delay element can be an optical or electronic delay loop. When a portion is to be coupled out of the high-energy beam for the dividing beam, the synchronizing device advantageously has a delay element in only one of the beam paths of the high-energy beam or dividing beam.

The basic idea of the invention starts from the problem that, under the required process conditions (near the triple point of the target material), xenon, which is presently favored as a target material for EUV sources in semiconductor lithography, can only be provided as a continuous target flow which is very susceptible to hydrodynamic disturbances. However, particularly in radiation sources for semiconductor lithography in which the highest possible pulse repetition frequency is required, the hydrodynamic instability of the target is the limiting factor for the desired increase in pulse energy and repetition frequency.

The invention resolves this conflict in that in order to provide the target in a highly repetitive manner the energy pulse generating the radiating plasma impinges on a target volume that is decoupled from the target volume flowing after it by a separation process that takes place ahead of it spatially (division or at least spatially limited thinning of the continuous target flow over the entire target diameter). By means of a small (compared to the high-energy pulse) introduction of energy, the hydrodynamic disturbances caused by the radiation-generating energy pulse cannot propagate in the subsequently flowing target volume or is at least greatly attenuated. The resulting advantages are potentially high pulse repetition frequencies and—in contrast to conventional droplet generation—a volume that can be adjusted relatively simply over the length of the decoupled target portion which results in low debris emission by way of a mass-limited target. Further, the synchronization of the separating process with the radiation-generating energy pulse is also substantially simpler than in "natural" droplet formation in which the droplet frequency is not completely free from fluctuations.

Moreover, due to the low divergence of the target flow that is initially provided in a continuous manner (jet), a relatively large working distance from the nozzle can be selected (order of magnitude of several centimeters). Accordingly, in conjunction with the inventive separation of the continuous target flow, the erosion of the nozzle of the target generator and the thermal loading per unit of area are reduced.

The invention makes it possible to realize a radiation source with a high average output based on a plasma for generating an intensive short-wavelength radiation which permits an efficient energy conversion (with excitation pulse energies of some 10 mJ) in a desired spectral band and a high repetition frequency (several kHz) of the plasma excitation with a liquid target flow that is provided in a reproducible manner. This appreciably reduces erosion of the target nozzle and/or emission of debris.

In the following, the invention will be described more fully with reference to embodiment examples.

DESCRIPTION OF THE PREFERRED EMBODIMENTS

Figure 1:
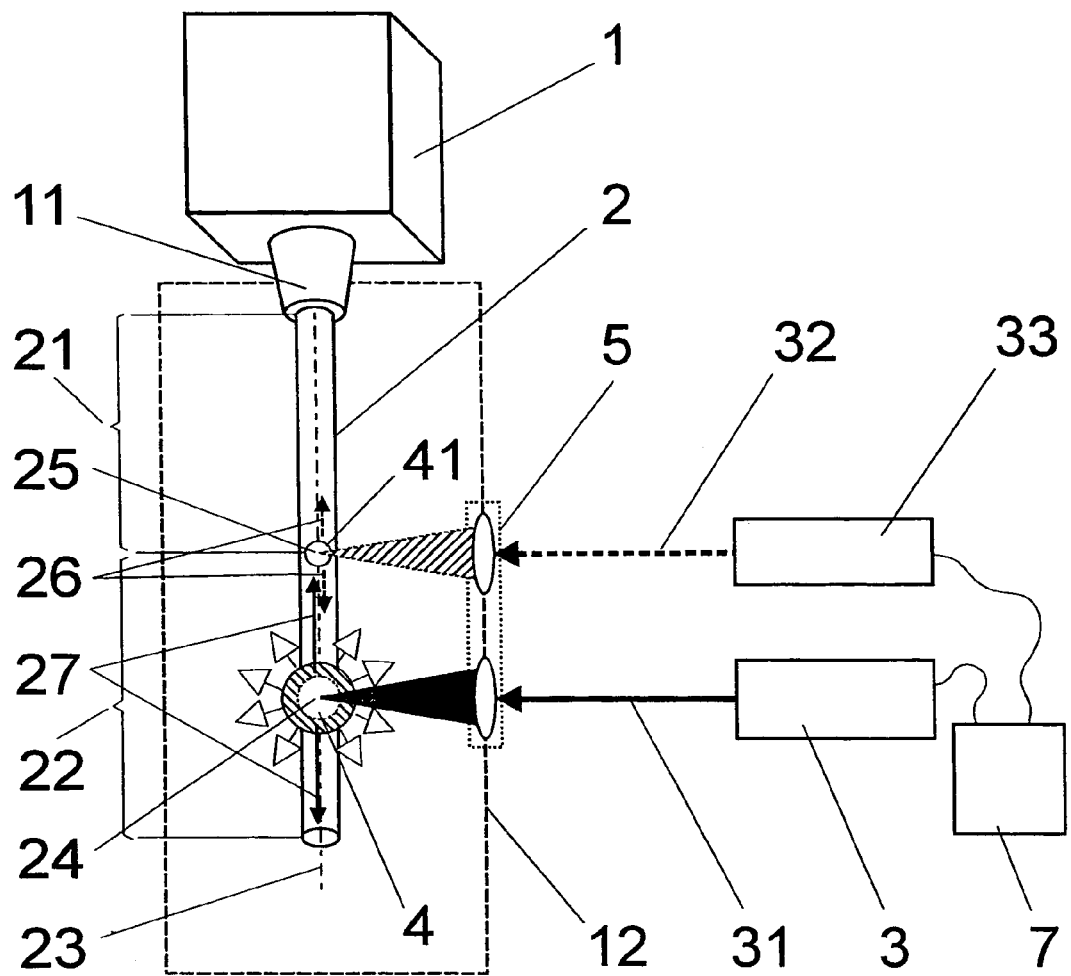
FIG. 1 shows a basic view of the arrangement according to the invention for generating radiation with a target flow that is provided in a reproducible manner, wherein a dividing pulse that lies ahead of the plasma-generating high-energy beam spatially is provided for suppressing shock waves running back into the target flow.

The method, according to the invention, that can be derived in principle from FIG. 1 comprises the following steps:

generating a continuous target flow 21, preferably a liquid jet (or, simply, jet), by means of a suitably shaped nozzle 11 of a target generator 1;

radiating an energy pulse on a dividing point 25 which leads to a spatially limited, at least partial vaporization (thinning) of the continuous target flow 2 for generating a shock wave barrier relative to the continuous target jet 21;

radiating a high-energy beam 31 on an interaction point 24 that follows the dividing point 25 spatially in such a way that the volume (portion 22) of the target flow 2 downstream of the dividing point 25 is converted at least partially into radiation-emitting plasma.

A preferably emitted wavelength range of the radiation plasma 4 is adjusted by varying at least one of the following parameters: diameter of the target flow 2; pulse energy of the high-energy beam 31.

FIG. 1 shows the target flow 2 divided into a continuous target jet 21 and at least one portion 22 that is separated in a defined manner. When using a target material that is gaseous under normal conditions (xenon, in the present example), the gas is liquefied in the target generator 1 at suitable pressure and suitable temperature and a liquid jet is subsequently injected into the vacuum chamber 12 through a target nozzle 11 (and possibly is even frozen when exiting from the target nozzle 11 into the vacuum chamber 12).

The target volume of portion 22 which is to be excited by an energy pulse of the high-energy beam 31 is at least substantially divided from the originally continuous target flow 2 on the axis 23 spatially in front of the interaction point 24 by means of the pulsed action of the additional energy beam 32 that is provided from a dividing beam source 33. This means that the high-energy beam 31 impinges on a target flow 2 that is at most still somewhat continuous. By dividing (thinning) the target flow 2 at least partially, it is ensured that hydrodynamic disturbances (shock waves 27) are minimized in the subsequent continuous target jet 21 connected to the target nozzle 11. The radiation-generating pulse of the high-energy beam 31 is accordingly focused on a target volume that is not directly connected to the target nozzle 11. The pulse parameters are selected in such a way that the efficiency of the radiation generation is optimized in the desired wavelength region (e.g., EUV region around 13.5 nm).

The radiation-generating pulse of the high-energy beam 31 and the additional energy pulse of the additional energy beam 32 lying ahead of it in the direction of the target nozzle 11 both cause shock waves that propagate along the axis 23 of the target flow 2. Shock waves 26 caused by the dividing pulse of the additional energy beam 32 are identified by dashed arrows in FIG. 1 and shock waves 27 caused by the radiation-generating pulse of the high-energy beam 31 are indicated by solid black arrows. The amplitudes of the shock waves 26 and 27 are represented by the arrow lengths.

However, the amplitude of the shock wave 26 proceeding from the additional energy pulse of the dividing beam source 33 is substantially smaller than that of the hot plasma 4 caused by the high-energy beam 31.

By means of the dividing pulse of the dividing beam source 33, the target material is changed to a vapor phase over the entire cross section (in most cases, this is an expanding cold plasma, i.e., a plasma that hardly emits radiation in the relevant spectral region, e.g., at 13.5 nm).

When the shock wave 27 proceeding from the (hot) plasma 4 at the interaction point 24 reaches the location of the cold plasma 41, the density of the originally continuous target jet 21 has decreased so sharply at that location at the dividing point 25 that the shock wave 27 running back into the target flow 2 is greatly attenuated.

The portion 22 of the target flow 2 can be considered sufficiently decoupled (separated) when the amplitude of the shock wave 27 of the hot plasma 4 generated by the radiation-emitting energy pulse is smaller in the continuous target jet 21 communicating with the target generator 1 than the amplitude of the shock wave 26 of the dividing pulse (shock wave barrier).

The adjustment of the volume of portion 22 (as mass-limited target) is carried out at a constant diameter of the target flow 2 through the timing and magnitude of the introduced energy of the dividing pulse and through the timing and distance of the high-energy pulse of the energy beam source 3 relative to the dividing pulse generated by the dividing beam source 33.

When the shock wave 27 at the interaction point 24 proceeding from the hot plasma 4 reaches the location of the cold plasma 41, the density of the continuous target jet 21 at that location has decreased so much that the shock wave 27 running upstream in the target flow 2 is transmitted in a highly attenuated manner at most. Assuming that the target flow 2 is recurrently acted upon synchronously by the dividing pulse and high-energy pulse, a portion 22 of the target flow 2 that is impinged upon by the high-energy beam 31 can be considered as divided on both sides and is therefore considered to be a mass-limited individual target.

In this connection, the timed sequence of the pulses of the high-energy beam 31 and additional energy beam 32 (dividing beam) is adjusted in such a way that the amplitude of the shock wave 27 of the pulse of the high-energy beam 31 running back into the continuous target jet 21 is smaller than the shock wave 26 of the dividing pulse initiated by the dividing beam 32. This preferably takes place by means of a dividing pulse that precedes in time. In FIG. 1, a synchronizing device 7 is provided for this purpose between the energy beam source 3 and the dividing beam source 33, which synchronizing device 7 determines the time position of the two pulses and possibly varies them depending on a diagnostic unit (not shown) in order to extensively suppress registered hydrodynamic disturbances in the continuous target jet 21. Depending on the diagnosis which may also include observation of the conversion efficiency of the excitation radiation and emitted radiation, it is also possible to adjust a simultaneous or subsequent dividing pulse relative to the high-energy pulse.

Further, by suitably selecting the pulse energy of the energy beam source 3 and the volume (length) of the separated portion 22 of the target flow 2 (mass-limited target), the radiation conversion of excitation energy of the high-energy beam 31 can be optimized in the desired wavelength region of the hot plasma 4.

It is assumed in the following—without limiting generality—that a pulsed excitation laser beam 34 is used as high-energy beam 31 and a dividing laser beam 35 is used as dividing beam 32 and that an inert gas, preferably xenon, is used for the target flow 2. However, the same effect of plasma generation can also be achieved by an electron beam (energy>10 eV). In an analogous manner, lithium, fluorine, gallium to selenium, indium to strontium, or compounds thereof, particularly saline solutions or fluoro-fomblin, can be used as target material.

The apparatus which is shown in a simplified manner in FIG. 2 basically comprises—analogous to FIG. 1—a target generator 1 which injects a target flow 2 of liquid target material with a low divergence into a vacuum chamber 12 (p<1 mbar) by means of a target nozzle 11 (none of the elements mentioned above is shown in FIG. 2, with the exception of the target nozzle 11 and target flow 2), an individual energy beam source (not shown) which supplies a laser beam for dividing into an excitation laser beam 34 and a dividing laser beam 35, and a common focusing lens 51 that focuses the two laser beams 34 and 35 on different locations of the target flow 2. The target flow 2 is struck by the excitation laser beam 34 at the interaction point 24 and by the dividing laser beam 35 at the dividing point 25 which lies along the axis 23 of the target flow 2 spatially in front of the interaction point 24.

The linearly polarized energy beam generated by a laser (serving as the energy beam source 3) enters a beam guiding device 6 and is converted at that location, initially by a half-wave plate 61, into a laser beam with nonvanishing orthogonal polarization components. A polarizing beam splitter 62 then carries out a division (in this case, unequal) into a high-energy excitation laser beam 34 (solid line and polarization vector perpendicular to the drawing plane) and a weaker, dividing laser beam 35 (dashed lines and polarization vector parallel to the drawing plane) by splitting the polarization directions.

The energy of the dividing laser beam 35 is to be selected in such a way that the target material at the dividing point 25 evaporates over the cross section of the target jet 21, so that at least a sufficient thinning is carried out over the entire cross section of the target flow 2 and, at most, the generation of an expanded cold plasma 41 causes a complete separation of the portion 22 of the target flow 2. The radiation-generating energy pulse of the excitation laser beam 34 and the pulse of the preceding dividing laser beam 35 both cause shock waves 26 and 27 which propagate along the axis 23 of the target flow 2. The pulse of the dividing laser beam 35, which has a substantially lower pulse energy than the pulse of the excitation laser beam 34 impinging at the interaction point 24 (<25% of the pulse energy of laser beam 35), thins the continuous target jet 21 at the dividing point 25 to the extent that a portion 22 is separated at least with respect to the shock wave transmission in the direction of the target nozzle 11.

In the case of the locally thinned target flow 2, the decoupling of the portion 22 from the area of the continuous target jet 21 is considered to be sufficient and the target flow 2 is considered to be "separated in principle" when the hydrodynamic disturbances caused by the pulse of the excitation laser beam 34 are attenuated to the extent that they are no longer perceived as troublesome in the continuous target jet 21 that flows afterward, i.e., when they are smaller in the continuous target jet 21 than the shock waves 26 generated by the (substantially smaller) pulse of the dividing laser beam 35.

After polarization splitting, the dividing laser beam 35 is guided by a deflecting mirror 63 to another polarizing splitter 64 which is oriented in the passing direction for the polarization vector of the dividing laser beam 35 and which joins the two separated laser beams 34 and 35 again for focusing on the target flow 2.

The excitation laser beam 34 is adjusted by means of a tilting mirror 65 in such a way that it strikes the additional splitter 64 in the reflection direction for its polarization vector. Due to the position of the tilting mirror 65, the excitation laser beam 34 diverges slightly from the orthogonal direction with respect to the passing direction of the dividing laser beam 35 so that two beam bundles 52 and 53 which are polarized orthogonal to one another and inclined relative to one another strike a common focusing lens 51.

As a result, the two inclined beam bundles 52 and 53 are focused through the focusing device 5 on different locations, the dividing point 25 and the interaction point 24. Accordingly, the excitation laser beam 35 again strikes a portion 22 which—as was described above—is sufficiently decoupled from the latter area of the target flow 2 at least with respect to the shock wave propagation in the continuous target jet 21.

As will be explained more fully in the following examples, the timed sequence in which the pulses of the excitation laser beam 34 and dividing laser beam 35 impinge on the target flow 2 can be controlled in different ways. The arrangement according to FIG. 2 primarily makes use of a delay due to the different optical path lengths as will be shown in detail in the following examples.

However, laser pulses of the excitation laser beam 34 and dividing laser beam 35 that are offset in time can also be generated directly by means of suitable pulse shaping in an individual laser and the pulses that are then always offset in time are correspondingly divided through the use of an optical switch (not shown) in the beam path of the laser.

In the following five examples, different variants of the beam guiding device 6 for optical beam guiding and positioning of the excitation laser beam 34 and dividing laser beam 35 are described in order to effectively influence the target flow 2 with the smallest possible space requirement of the beam input-coupling into the vacuum chamber 12. For this purpose—without limiting generality—two laser beams with beam bundles 52 and 53 that are inclined relative to one another (i.e., that are not axially parallel with respect to the focusing lens 51) are focused on two different target locations along the axis 23 of the target flow 2 in the first four examples by a common focusing lens 51.

In order to illustrate the basic optical variants for coupling in the two laser beams—the excitation laser beam 34 and dividing laser beam 35—and to include the different possibilities for the timed sequence of the two different laser pulses on the target flow 2, the target flow 2 is shown in the following without specifying the direction and the excitation laser beam 34 and dividing laser beam 35 are not expressly designated. When two separate lasers are used (Examples 2 to 4), they are referred to as laser A and laser B so that both lasers A and B can be used alternatively for generating the excitation laser beam 34 or the dividing laser beam 35.

EXAMPLE 1

Figure 2:
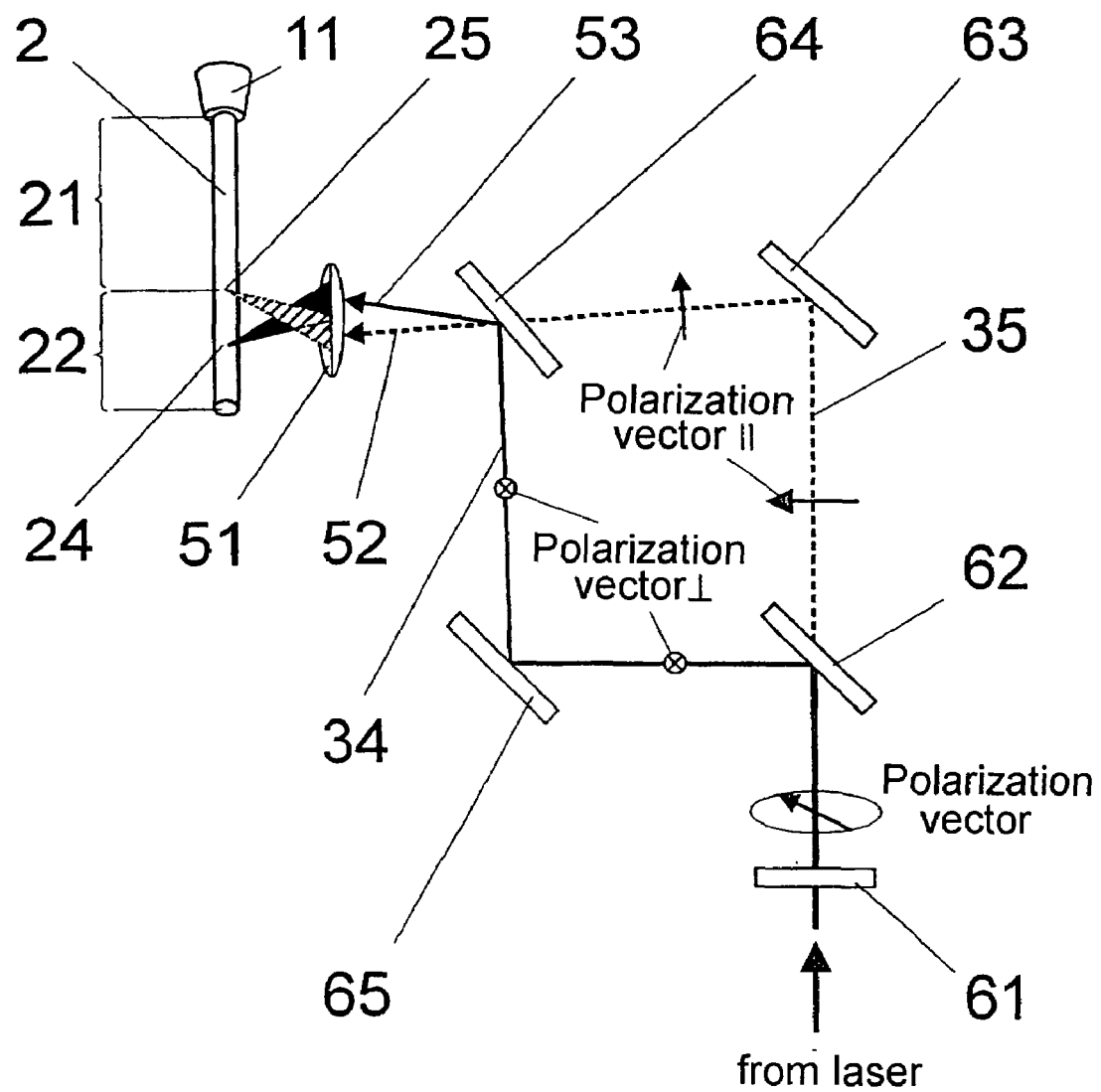
FIG. 2 shows an embodiment form of the invention with a dividing laser beam that is coupled out of an excitation laser beam, wherein the two laser beams are focused on the target flow by the same focusing optics.
Figure 3:
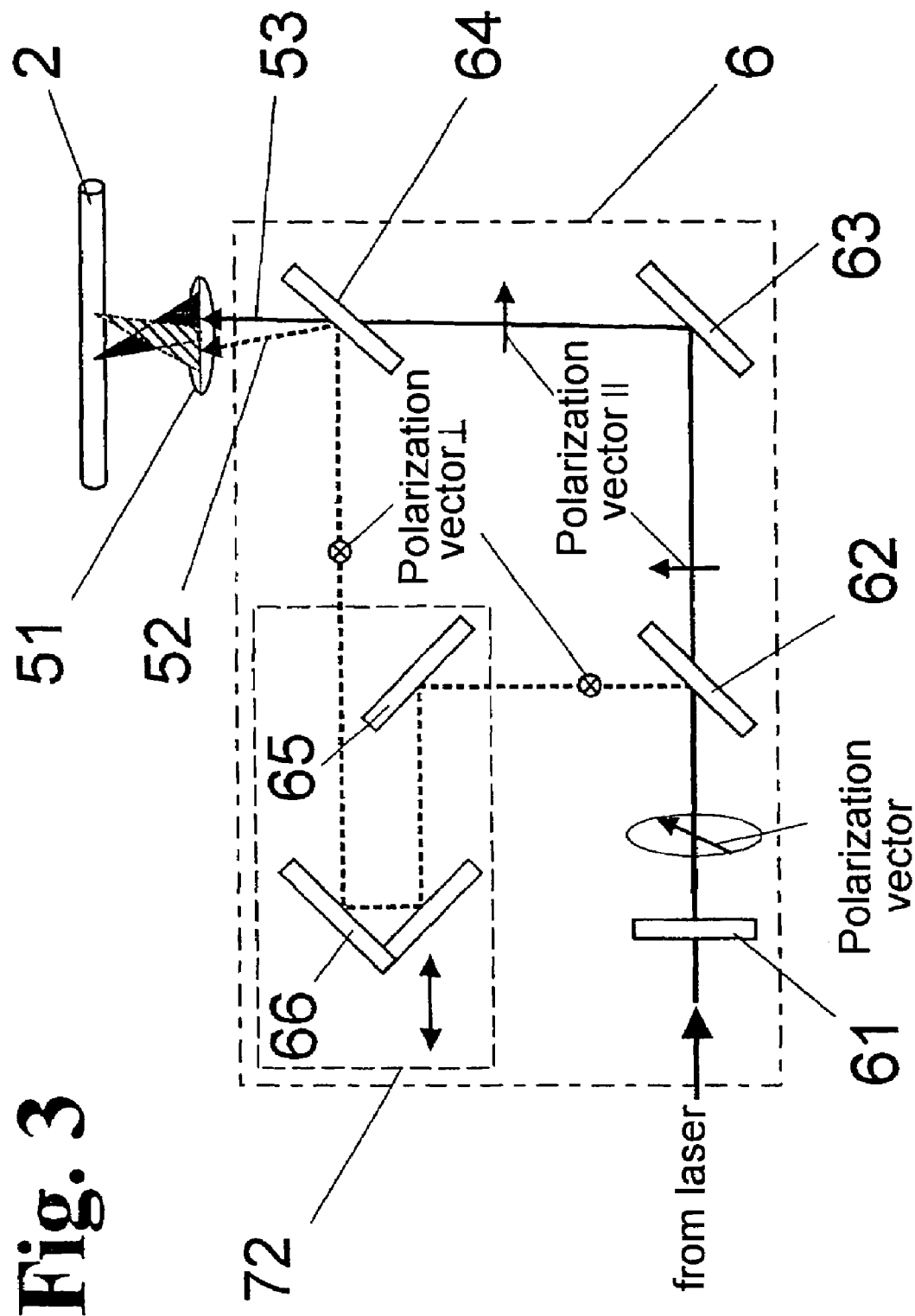
FIG. 3 shows a construction of the embodiment form of FIG. 2 in which the excitation laser beam and the dividing laser beam have an optical delay element for adjusting the time position of the two laserpulses.

FIG. 3 is based on the diagram in FIG. 2 in that a polarized laser beam enters a beam guiding device 6, where it is converted by a half-wave plate 61 into a laser beam with nonvanishing orthogonal polarization components and is divided by means of a polarizing beam splitter 62 into different portions with polarization vectors ∥ and ⊥, respectively, that are parallel to or perpendicular to the drawing plane.

The laser beam with the parallel polarization vector ∥ arrives at the focusing lens 51 via a deflecting mirror 63 and a polarizing splitter 64 for this polarization direction located in the passing direction.

The laser beam with the perpendicular polarization vector ⊥ is directed by a tilting mirror 65 to a retroreflector 66 which reflects in parallel the beam deflected by the tilting mirror 65 and directs it to the polarizing splitter 64. The beam path along the tilting mirror 65 and the retroreflector 66 to the splitter 64 is an optical delay element 72 by which the time sequence of the two laser beams can be adjusted relative to one another when the retroreflector 66 is moved corresponding to the direction indicated by the arrow.

Due to the orientation of the tilting mirror 65, the laser beam with the perpendicular polarization vector ⊥ is reflected at the splitter 64 in such a way that it strikes the focusing lens 51 at different angles relative to the laser beam with the parallel polarization vector ∥ that is likewise guided to the focusing lens 51 and different locations of the foci are accordingly formed on the target flow 2.

EXAMPLE 2

Figure 4:
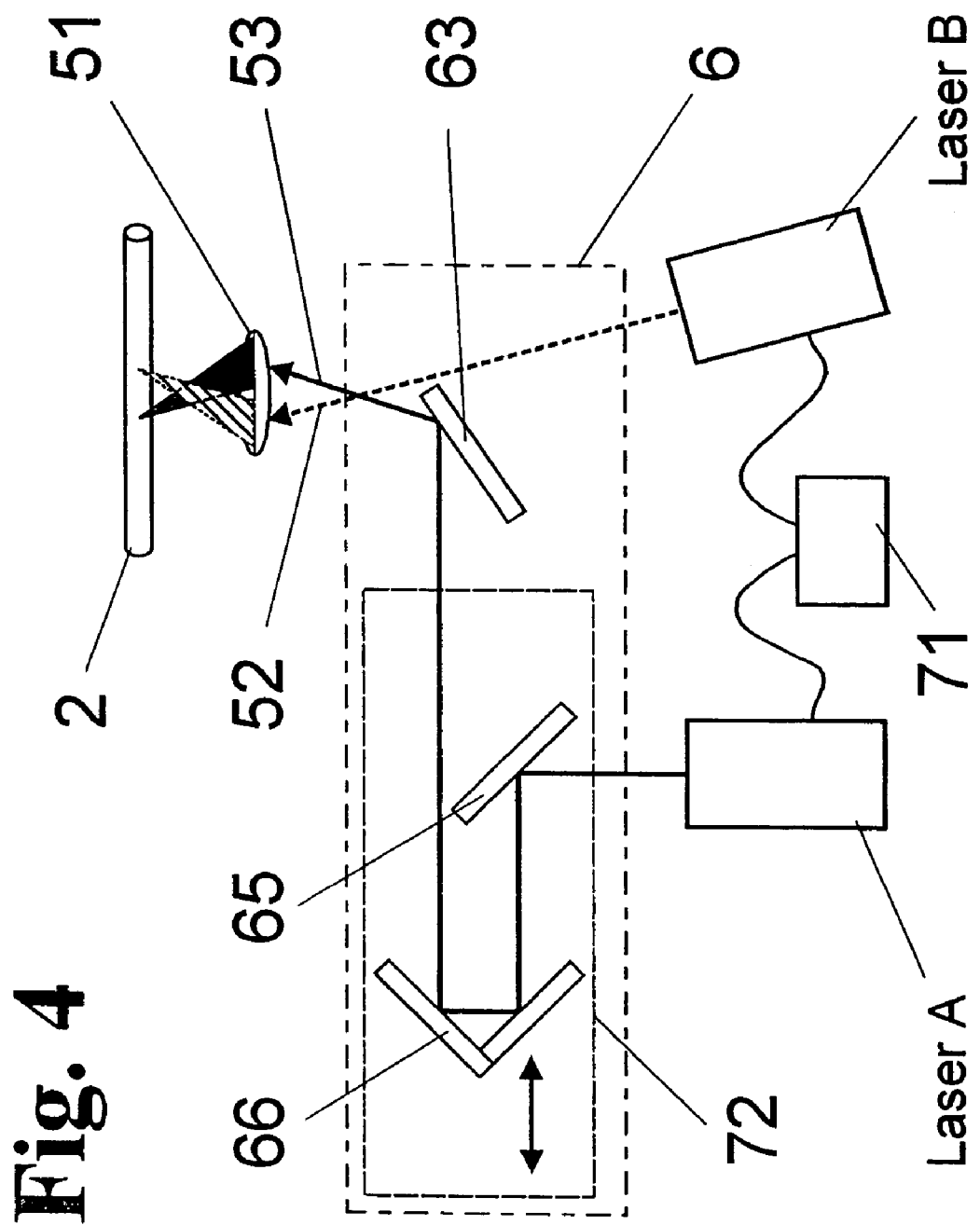
FIG. 4 shows an embodiment form of the invention with two triggered, unpolarized lasers for generation a radiating plasma and for separating target portions, wherein the two laser beams are focused on the target flow by the same focusing optics and one of the laser beams has an optical delay element.

In the variant according to FIG. 4, the excitation laser beam 34 and dividing laser beam 35 are generated in two triggered lasers, laser A and laser B. The trigger unit 71 provided for this purpose normally triggers both lasers A and B simultaneously so that a delay element, which is realized in this case as an optical delay element 72 as in FIG. 3, is required for adjusting a time shift of the laser pulses. However, controlling by means of offset trigger pulses from the trigger unit 71 is also possible.

In this example and in all of the following examples, the portions 22 that are divided (not necessarily completely) from the continuous target jet 21 are generated in that the beam bundles 52 and 53 focused by the lasers A and B are focused on different locations (located one after the other along the target axis 23) which—assuming a target diameter of 20 μm—lie at a distance from one another of some 10 μm to several millimeters or in special cases (as is described later in Example 6) up to several centimeters depending on the pulse energy delivered by the excitation laser beam 34.

The embodiment form in FIG. 4 shows the focusing for two unpolarized lasers A and B of the same wavelength, whose beam bundles 52 and 53 impinging on the focusing lens 51 have beam axes that are inclined relative to one another in that one of the laser beams (laser B in this case) is geometrically guided past a deflecting mirror 63 by means of which the other laser beam (laser A in this case) is coupled into the focusing lens 51. The beam bundles 52 and 53 of the two lasers A and B intersect in front of and behind the focusing lens 51.

A desired time delay of the pulse of laser A relative to that of laser B can be realized in a simple manner through optical means by the tilting mirror 65 and the retroreflector 66 (right-angle mirror). When the retroreflector 66 is movable from and toward the mirrors 65 and 63 parallel to the incident and emergent beam axes, the optical path length and therefore the time delay between the laser pulses can be varied in any manner desired.

EXAMPLE 3

Figure 5:
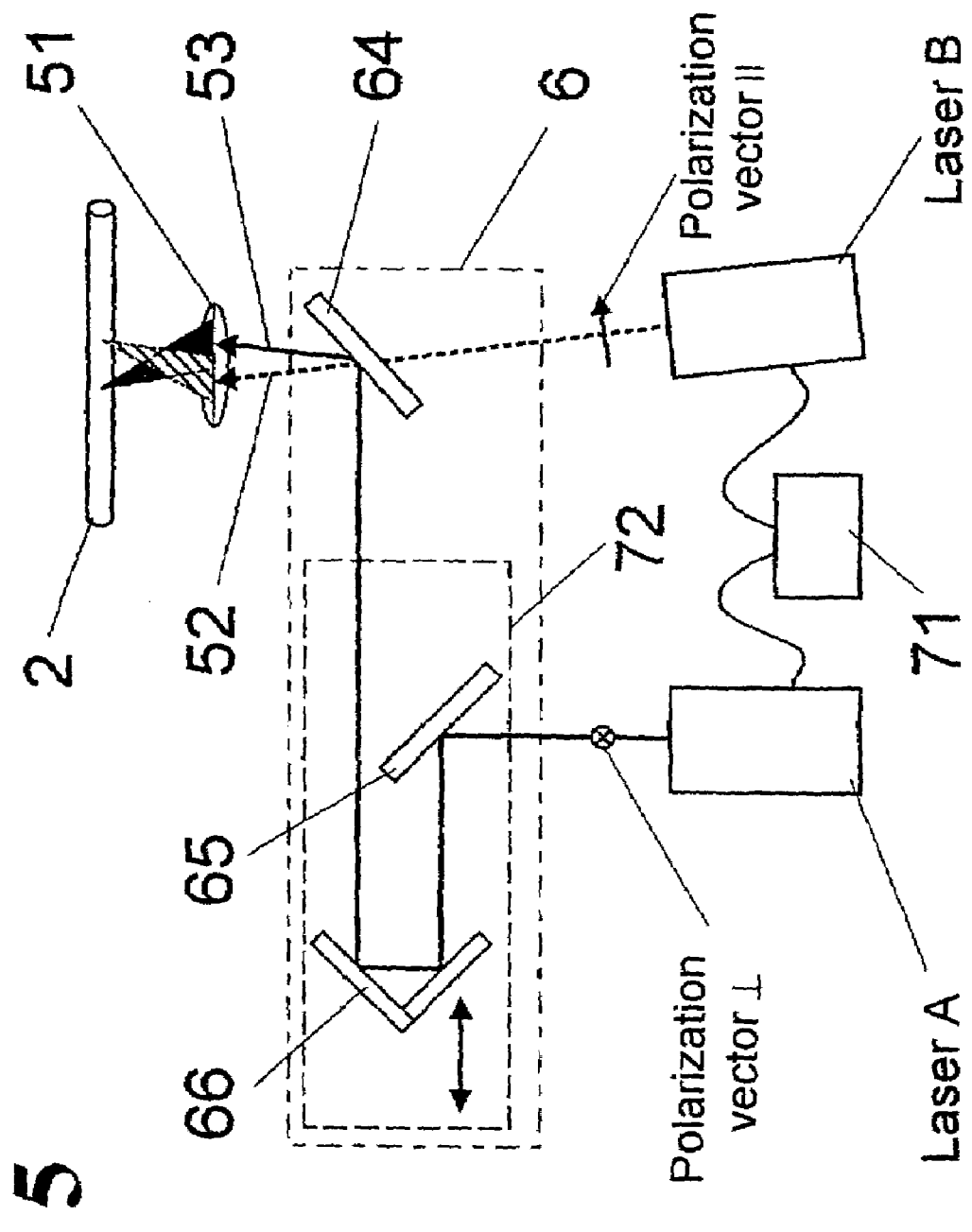
FIG. 5 shows an embodiment form with two triggered lasers that are polarized orthogonal to one another for separating the target portions and for generating a radiating plasma, wherein the two laser beams are focused on the target flow by the same focusing optics and one of the laser beams has an optical delay element.

In the arrangement shown in FIG. 5, two lasers A and B which are polarized linearly orthogonal to one another are combined by a polarizing splitter 64. The beam bundles 52 and 53 striking the focusing lens 51 are tilted slightly with respect to one another. The inclination of the beam axis directed to the splitter 64 is adjusted by the tilting mirror 65. As is described with reference to FIG. 4, a time delay of the pulses of the two lasers A and B, which is again optional, is realized by optical means by an additional retroreflector 66. In this example, the adjustment of the pulse delay of laser A is again carried out by means of a movable retroreflector 65, but could be realized alternatively in the same way in the beam path of laser B.

When using two lasers A and B with different wavelengths, the beam splitter 64—in contrast to the principle shown in FIG. 5—can also be realized as an edge filter (dichroic mirror) for combining the two laser beams with a slight tilt relative to the optical axis of the focusing lens 51.

The beam bundles 52 and 3 of the two lasers A and B can at least partly overlap in the common focusing lens 51 and are again focused on the desired two different locations of the target flow 2 at different angles.

In the preceding examples 1 to 3, the delay element 72 with the tilting mirror 65 and retroreflector 65 is always considered optional. Optical paths of equal length can also be used by dispensing with the retroreflector 66 and by directing the tilting mirror 65 (rotated by 90°) to the polarization-optical beam splitter 64 so as to be inclined in a defined manner relative to the laser beam. A delay can also be realized electronically.

EXAMPLE 4

Figure 6:
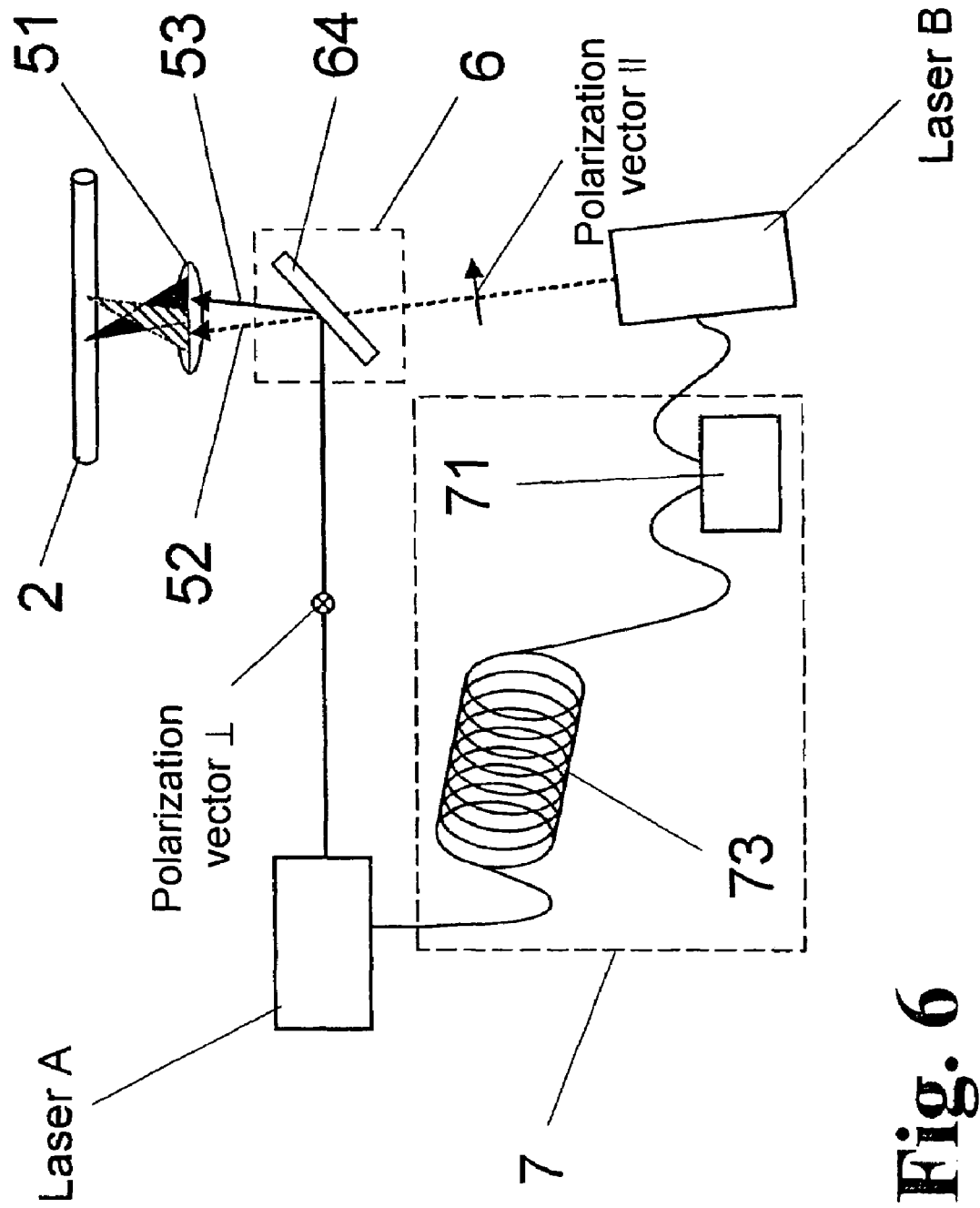
FIG. 6 shows a variant of the invention analogous to FIG. 5 with two triggered, polarized lasers, wherein an electronic delay element is provided in one of the laser beams for adjusting the time position of the two laserpulses relative to one another.

The two lasers A and B shown in FIG. 6 have orthogonal linear polarization directions relative to one another and are (as in FIG. 5) coupled in on the common focusing lens 51 by means of a polarization-optical beam splitter 64. As in the preceding example, the beam bundles 52 and 53 strike the focusing lens 51 at different angles and partially overlap.

A delay loop is realized in this example by an electric delay element 73 and is represented in FIG. 6 as a delay line of corresponding length. The optical paths of the beam paths of laser A and laser B are of approximately equal length up to the focusing lens 51. The trigger unit 71 provides the same trigger pulses for both lasers A and B (simultaneously). However, the electric delay element 73 could also be replaced by a trigger unit 71 that is capable of sending phase-shifted trigger pulses to lasers A and B.

EXAMPLE 5

Figure 7:
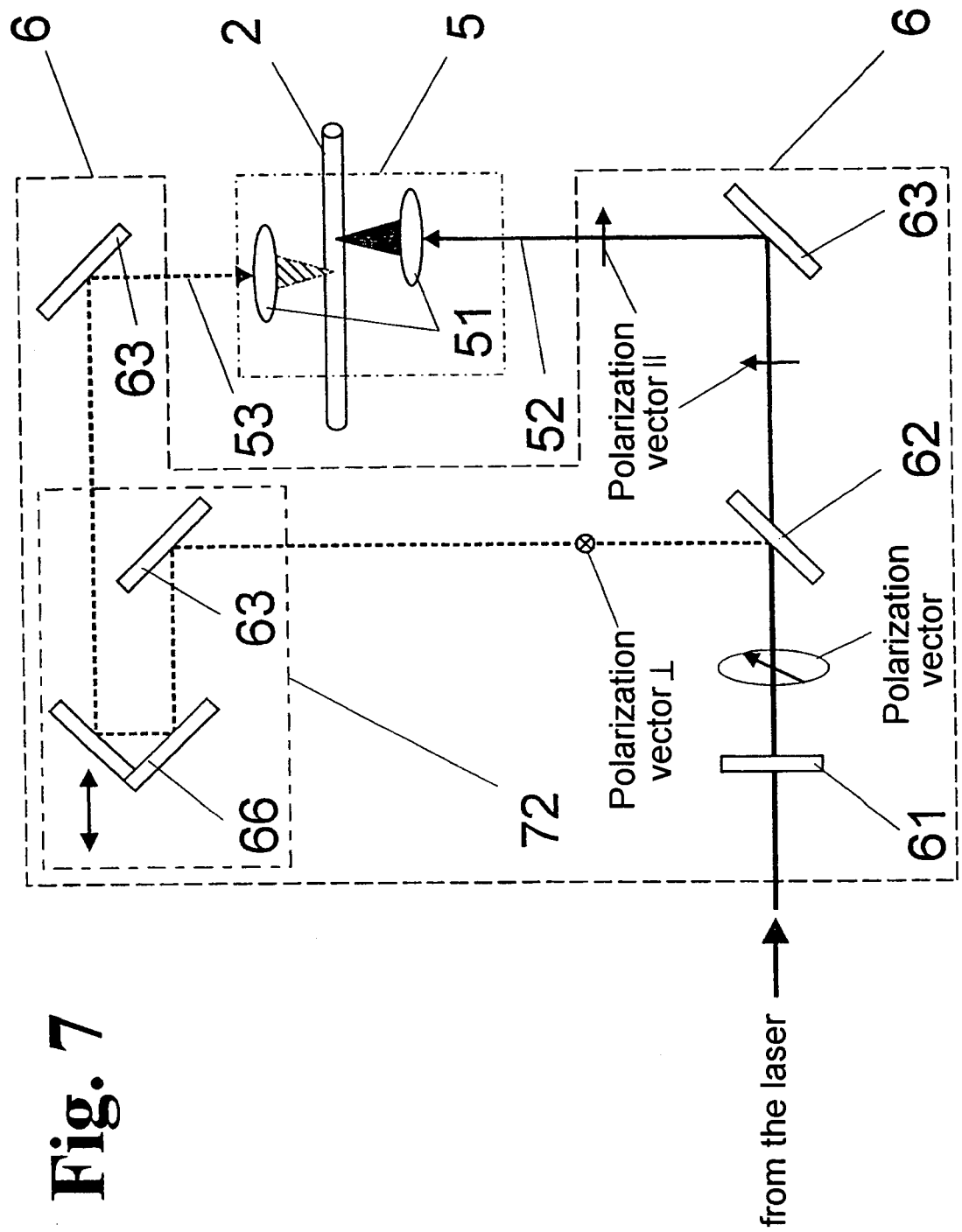
FIG. 7 shows an embodiment form of the invention with laser beams that are polarized orthogonal to one another and which are focused on the target flow by separate focusing optics, and an optical delay element.

In FIG. 7, a laser beam used as energy beam 31 is divided in the same way as is shown in FIG. 2 and FIG. 3. However, after the division, which is shown in this example as polarization-optical beam splitting (but which can also advantageously be a dichroic division), it can be guided as completely separate beam paths.

The two beam paths are not subsequently joined by a polarizing splitter 64, but are focused on two different locations of the target flow 2 separately by two separate focusing lenses 51.

For reasons of space, the beam bundles 52 and 53 to be focused are to be oriented in different radial directions around the axis 23 of the target flow 2. In the present example, they can both impinge orthogonal to the axis 23 of the target flow 2. As is shown in FIG. 7, their diametrically opposed incident direction was selected only by way of example because of the simpler two-dimensional view. The optical axes of the two focusing lines 51 preferably enclose an angle of less than 90° around the axis 23.

The optical delay element 72 formed by deflecting mirror 63 and retroreflector 66 is again considered optional and is only required when plasma generation and division are to be carried out with a delay in time with respect to one another.

The essential advantage of a mass-limited target generated according to the preceding examples in the form of a defined portion 22 consists in a potentially very high repetition frequency of the pulses for generating the radiating plasma 4.

Further, in contrast to individual droplets, whose volume can be varied only slightly when the nozzle diameter is fixed, the volume of the separated portion 22 can be adjusted relatively simply by means of the spatial distance between the dividing point 25 of the dividing beam 25 (advantageously the dividing laser beam 35) and the interaction point 24 of the energy beam 31 (advantageously laser beam 34).

The synchronization of the energy beam 31 and dividing beam 32, particularly when both are laser beams, is also substantially simpler than synchronizing an excitation laser to separate droplet targets that are provided through oscillating mechanical generation in which the frequency of the droplet formation is not totally free from fluctuations.

Due to the low divergence of a continuous target jet 21, a relatively large working distance (on the order of several centimeters) from the target nozzle 11 of the target generator 1 can be selected.

EXAMPLE 6

With reference to FIG. 1, a special construction of the invention is described in the following in which a particularly long portion 22 can be separated from the target jet 21 exiting continuously from the target nozzle 11 by the dividing beam 32.

A freely progressing, long portion 22 of this kind is then repeatedly acted upon successively along its length by the high-energy beam 31 when passing the interaction point 24. The length of the portion 22 and the quantity of the high-energy pulses "fired off" on it is limited by the stability of the target material after the effect of the shock waves 27 starting with the first pulse of the high-energy beam 31.

In this embodiment form, the transmission of the shock waves 27 and their disruptive effect when the target flow 2 exits from the target nozzle 11 of the target generator 1 is prevented in all cases, so that the highly sensitive process of injecting the target flow 2 into the vacuum chamber 12 can be better controlled and stabilized.

While the foregoing description and drawings represent the present invention, it will be obvious to those skilled in the art that various changes may be made therein without departing from the true spirit and scope of the present invention.

Reference Numbers 1 target generator
11 target nozzle
12 vacuum chamber
2 target flow
21 continuous target jet (first portion)
22 second portion
23 axis (of the target flow)
24 interaction point
25 dividing point
3 energy beam source
31 high-energy beam
32 dividing beam (additional energy beam)
33 dividing beam source
34 excitation laser beam
35 dividing laser beam
4 hot plasma
41 cold plasma
5 focusing device
51 focusing lens
52, 53 beam bundles
6 beam guiding device
61 half-wave phase plate
62 polarization-optical splitter
63 deflecting mirror
64 (combining) beam splitter
65 tilting mirror
66 retroreflector
7 synchronizing device
71 trigger unit
72 optical delay element
73 electric delay element

What is claimed is:

1. A method for plasma-based generation of soft x-radiation, particularly for the generation of extreme ultraviolet (EUV) radiation, in which defined portions of a target flow that is provided in a reproducible manner are made to interact with a pulsed high-energy beam for exciting a radiation-emitting plasma, wherein the interaction results in the generation of a radiation-emitting plasma, said method further comprising the steps of:

directing an additional energy beam on the target flow spatially in advance of its interaction with the high-energy beam, the target flow being acted upon by said additional energy beam with substantially weaker energy pulses compared to the high-energy beam in order to divide the target flow into a first portion and at least one second portion, wherein the target flow is excited at an interaction point within the second portion by the high-energy beam for generating a hot, radiating plasma; and generating the first portion by the target generator as a continuous target jet with low divergence and decoupling the second portion from the first portion and therefore from the target generator at least in such a way that a hydrodynamic disturbance generated in the second portion by a pulse of the high-energy beam at the interaction point is transmitted into the first portion as a negligible disturbance compared to the disturbance of the additional energy beam.

2. The method according to claim 1, wherein the energy pulse of the additional energy beam impinges on the target flow prior in time to the pulse of the high energy beam.

3. The method according to claim 1, wherein the pulse of the additional energy beam and the pulse of the high-energy beam impinge on the target flow simultaneously.

4. The method according to claim 1, wherein the energy pulse of the additional energy beam impinges on the target flow subsequent in time to the pulse of the high energy beam.

5. The method according to claim 1, wherein the target flow is repeatedly acted upon by the additional energy pulse in a regular sequence in order to generate a series of defined second portions, each of which is a mass-limited individual target.

6. The method according to claim 1, wherein the pulses of the additional energy beam and of the high-energy beam are applied so as to be synchronized with one another at repetition frequencies greater than 1 kHz.

7. The method according to claim 1, wherein the target flow is provided as a continuous target jet in liquid or solid aggregate state at least at the location of the impinging additional energy beam.

8. The method according to claim 7, wherein the target flow as continuous target jet is generated from a liquefied or frozen gas.

9. The method according to claim 8, wherein the target flow is generated from a liquefied or frozen inert gas, preferably xenon.

10. The method according to claim 1, wherein the additional energy beam is split off from the high-energy beam, and the pulses of the high-energy beam and additional energy beam are synchronized by means of a synchronizing device.

11. The method according to claim 1, wherein the additional energy beam is provided from a separate dividing beam source and its pulses are synchronized with those of the high-energy beam by suitable triggering.

12. An arrangement for the plasma-based generation of soft x-radiation, particularly for the generation of extreme ultraviolet (EUV) radiation comprising:
  a target generator for providing a low-divergence target flow which is provided in a reproducible manner in a vacuum chamber and with a pulsed high-energy beam that is focused on defined portions of the target flow at an interaction point for generating a radiation-emitting plasma;
  an additional pulsed energy beam being directed on the target flow spatially in front of the interaction point for dividing the target flow into a first portion and at least one second portion, the additional energy beam having a substantially lower pulse energy compared to the high-energy beam;
  said first portion having a connection to the target generator that is characterized by a continuous target jet;
  said second portion being decoupled from the continuous target jet and from the target generator at least in such a way that a hydrodynamic disturbance generated in the second portion by a pulse of the high-energy beam at the interaction point is transferred into the first portion at most as a disturbance that is negligible compared to the disturbance of the additional energy beam; and
  means being provided for synchronizing the pulses of the high-energy beam and additional energy beam.

13. The arrangement according to claim 12, wherein the target flow from the target generator to a dividing point defined by the impingement of the additional energy beam is a continuous target jet of liquefied or frozen gas.

14. The arrangement according to claim 12, wherein the target flow comprises an inert gas.

15. The arrangement according to claim 14, wherein the inert gas is xenon.

16. The arrangement according to claim 12, wherein a separate radiation source is provided for generating the additional energy beam.

17. The arrangement according to claim 12, wherein the additional energy beam is coupled out of the high-energy beam.

18. The arrangement according to claim 12, wherein the additional energy beam is an electron beam.

19. The arrangement according to claim 12, wherein the additional energy beam is an ion beam.

20. The arrangement according to claim 12, wherein the additional energy beam is a laser beam.

21. The arrangement according to claim 20, wherein the high-energy beam for exciting the radiating plasma is an excitation laser beam.

22. The arrangement according to claim 20, wherein a separate dividing beam source is provided for generating the high-energy beam in the form of a dividing laser beam.

23. The arrangement according to claim 21, wherein optical means for coupling out a portion from the excitation laser beam are provided for generating the dividing laser beam.

24. The arrangement according to claim 21, wherein a focusing device is provided for coupling in the excitation laser beam and dividing laser beam on the target flow.

25. The arrangement according to claim 24, wherein the focusing device has separate focusing lenses for the excitation laser beam and dividing laser beam.

26. The arrangement according to claim 24, wherein the focusing device has a common focusing lens for the excitation laser beam and dividing laser beam, wherein the excitation laser beam and dividing laser beam are coupled in and focused at different angles as beam bundles.

27. The arrangement according to claim 24, wherein a beam guiding device containing at least one beam-deflecting element is provided for coupling in the two beam bundles on the focusing lens at different angles.

28. The arrangement according to claim 27, wherein the beam guiding device contains at least one polarization-selective element.

29. The arrangement according to claim 27, wherein the beam guiding device contains at least one wavelength-selective element.

30. The arrangement according to claim 27, wherein the beam guiding device contains at least one tilting mirror which is constructed for adjusting the different incident angles of at least one of the beam bundles.

31. The arrangement according to claim 12, wherein a synchronizing device is provided for adjusting the time position of the pulses of the high-energy beam and additional energy beam.

32. The arrangement according to claim 31, wherein the synchronizing unit has a trigger unit.

33. The arrangement according to claim 32, wherein the synchronizing unit has a delay element.

34. The arrangement according to claim 32, wherein the synchronizing unit has a trigger unit and an optical delay element.

* * * * *